(12) United States Patent
Abello Rosello et al.

(10) Patent No.: US 10,853,998 B2
(45) Date of Patent: *Dec. 1, 2020

(54) SERIALISING A REPRESENTATION OF A THREE DIMENSIONAL OBJECT

(71) Applicant: HEWLETT-PACKARD DEVELOPMENT COMPANY, L.P., Houston, TX (US)

(72) Inventors: Lluis Abello Rosello, Sant Cugat del Valles-Barcelona (ES); Alvar Vinacua, Sant Cugat del Valles-Barcelona (ES); Pere Brunet, Sant Cugat del Valles-Barcelona (ES); Marc Comino, Sant Cugat del Valles-Barcelona (ES); Jordi Gonzalez Rogel, Sant Cugat del Valles-Barcelona (ES); Sergio Gonzalez, Sant Cugat del Valles-Barcelona (ES); Josep Giralt Adroher, Sant Cugat del Valles-Barcelona (ES); Sebastia Cortes Herms, Sant Cugat del Valles-Barcelona (ES); Alex Carruesco Llorens, Sant Cugat del Valles-Barcelona (ES)

(73) Assignee: Hewlett-Packard Development Company, L.P.C, Spring, TX (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/089,623

(22) PCT Filed: Oct. 12, 2016

(86) PCT No.: PCT/US2016/056564
§ 371 (c)(1),
(2) Date: Sep. 28, 2018

(87) PCT Pub. No.: WO2018/071011
PCT Pub. Date: Apr. 19, 2018

(65) Prior Publication Data
US 2019/0114829 A1    Apr. 18, 2019

(51) Int. Cl.
*B29C 64/393* (2017.01)
*G06T 17/00* (2006.01)
(Continued)

(52) U.S. Cl.
CPC .......... *G06T 17/005* (2013.01); *B29C 64/393* (2017.08); *G06F 30/00* (2020.01);
(Continued)

(58) Field of Classification Search
None
See application file for complete search history.

(56) References Cited

U.S. PATENT DOCUMENTS

| 4,694,404 | A | 9/1987 | Meagher |
| 8,022,951 | B2 | 9/2011 | Zhirkov et al. |

(Continued)

FOREIGN PATENT DOCUMENTS

| CN | 104616345 A | 5/2015 |
| EP | 2933777 A1 | 10/2015 |

(Continued)

OTHER PUBLICATIONS

Qin et al., "Rendering for 3D Animation Based on Octree", Journal of Computer Science & Systems Biology, Retrieved from Internet: http://www.omicsonline.org/rendering-for-3d-animation-based-on-octree-jcsb.10000117.php?aid=1289, Dec. 18, 2010, pp. 1-8.

(Continued)

*Primary Examiner* — Steven Z Elbinger
(74) *Attorney, Agent, or Firm* — Haseltine Lake Kempner LLP (57) ABSTRACT

In an example, a method includes receiving, at a processor, data representing at least part of an object to be manufac-
(Continued)

tured in a layer-by-layer manufacturing process. A serialised octree representation of at least part of the object may be generated from the data. In the serialised octree representation, nodes are ordered such that (i) a node representing a volume which includes a layer of the object to be generated earlier in an intended order of object generation precedes a node representing a volume which consists of layer(s) of the object to be generated subsequently; (ii) nodes representing a volume which includes a given layer of the object are ordered based on a level of the nodes within the octree representation, wherein parent nodes appear before descendent nodes; and (iii) nodes representing a volume which includes a given layer of the object and being of the same level within the octree representation are ordered according to a location encoding pattern.

18 Claims, 4 Drawing Sheets

(51) Int. Cl.
*G06T 9/40* (2006.01)
*G06F 30/00* (2020.01)
*G06T 15/08* (2011.01)
*B33Y 50/02* (2015.01)
*G06F 119/18* (2020.01)

(52) U.S. Cl.
CPC ............... *G06T 9/40* (2013.01); *G06T 15/08* (2013.01); *B33Y 50/02* (2014.12); *G06F 2119/18* (2020.01)

(56) References Cited

U.S. PATENT DOCUMENTS

| 8,970,583 | B1* | 3/2015 | Overbeck | ............... G06T 17/05 345/419 |
| 2013/0201189 | A1 | 8/2013 | Saal et al. | |
| 2013/0235050 | A1 | 9/2013 | Karras | |
| 2014/0324204 | A1* | 10/2014 | Vidimce | ............. B29C 67/0088 700/98 |

FOREIGN PATENT DOCUMENTS

| JP | 2006277562 | 10/2006 |
| WO | WO-2014172687 | 10/2014 |
| WO | WO-2016122625 | 8/2016 |

OTHER PUBLICATIONS

Wang et al. "Saliency-Preserving Slicing Optimization for Effective 3D Printing", Computer Graphics Forum, vol. 33, Issue No. 5, Retrieved from Internet: http://staff.ustc.edu.cn/~lgliu/Projects/2015_AdaptiveSlicing_3DPrinting/Papers/2015_CGF_AdaptiveSlicing.pdf, 2014, 12 pages.

Sridharan et al., An octree-based algorithm for the optimization of extraneous material removal in laminated object manufacturing (LOM, Journal of Manufacturing Systems, vol. 19, No. 6 Jan. 2001 pp. 355-364) (10 pages).

* cited by examiner

SERIALISING A REPRESENTATION OF A THREE DIMENSIONAL OBJECT

BACKGROUND

Additive manufacturing techniques may generate a three-dimensional object on a layer-by-layer basis through the solidification of a build material. In examples of such techniques, build material is supplied in a layer-wise manner and a solidification method may include heating the layers of build material to cause melting in selected regions. In other techniques, other solidification methods, such as chemical solidification methods or binding materials, may be used.

Data relating to a three-dimensional object to be generated may be provided to an additive manufacturing apparatus and used to generate the three-dimensional object.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied.

In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner. A coalescence modifying agent (also referred to as modifying or detailing agents), which acts to modify the effects of a fusing agent for example by reducing or increasing coalescence or to assist in producing a particular finish or appearance to an object, and such agents may therefore be termed detailing agents may also be used as a print agent in some examples. A coloring agent, for example comprising a dye or colorant, may in some examples be used as a fusing agent or a modifying agent, and/or as a print agent to provide a particular color for the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

Figure 1:
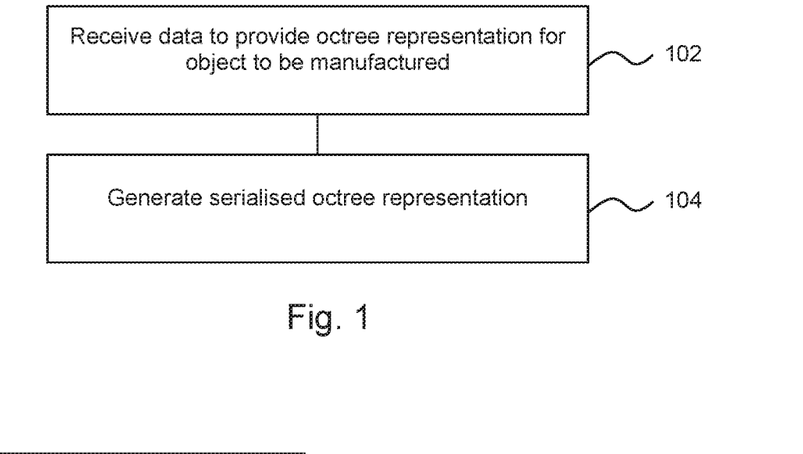
FIG. 1 is a flowchart of an example method for arranging data representing a three-dimensional object.

FIG. 1 is a flowchart of a method, which may be a computer implemented method, comprising, in block 102 receiving, at a processor, data to provide an octree representation of at least part of an object to be manufactured in a layer-by-layer manufacturing process.

In some examples, this data may be provided as a classical octree representation, in which the node representing the largest volume (the 'root' node) is described first, followed its octants, follow by their octants and so on.

In other examples, an octree may be built up from another representation of the object, for example from a design file, such as a STL file, a .OBJ file, a DXF file, a json file, a 3mf file, a vtk file, or the like. The object may be represented as a mesh (e.g. a polygon mesh), or in a series of slices. In some examples, the representation may comprise a print resolution representation of the data, for example comprising a specification of at least one attribute (for example, present or absent, a color, a texture, a transparency, a conductivity, a strength, a porosity, a resilience, or the like) or print material (for example, a choice of print agent or build material) for each 'voxel' of an object and/or a surrounding volume (for example, a cuboid enclosing the object). A voxel may be thought of as a volumetric pixel, and each voxel may be a print addressable area. In some examples, voxels are defined at the print resolution of an apparatus. In some examples, each voxel is the same shape and/or size, for example comprising cubes or the same size, whereas in other examples voxels may differ in size and/or shape.

Block 104 comprises generating, from the data and using the processor, a serialised octree representation of the object. In some examples, block 104 may comprise re-arranging an octree representation, while in other examples, the octree representation may be generated from data representing the object, which may represent the data in layer wise manner (e.g. the representation of the object may have been split into layers representing slices of the object), or at print resolution, or in some other way (noting that the data acquired in block 102 may not itself be an octree representation, although it does provide the data to build an octree representation). As is set out in greater detail below, the serialised representation is constructed such that the nodes are ordered in a particular manner. This may be thought of as a 'Z-first' ordering, when considering XYZ space in which the Z coordinate relates to the height of the object as it is generated in layers lying in an XY plane. As will become apparent, such an ordering may be suited for processing data relating to a three dimensional object to be generated in layers.

Figure 2:
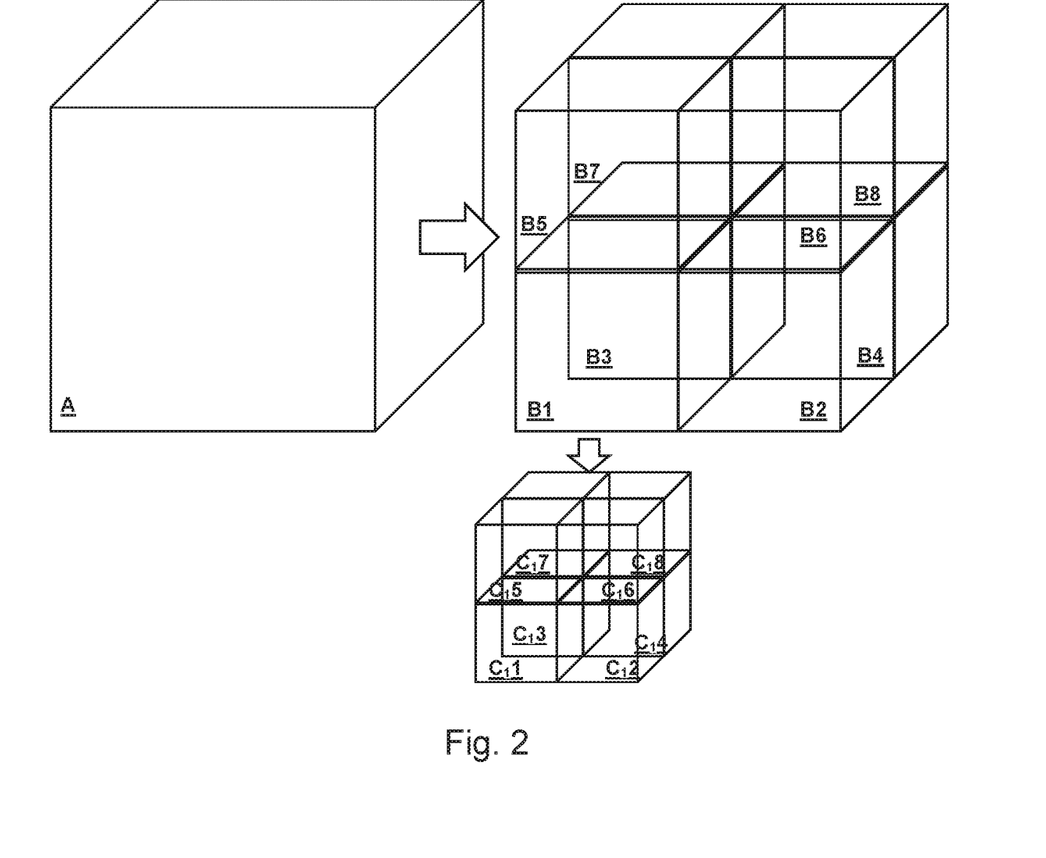
FIG. 2 is a schematic drawing illustrating an octree structure.

In this example, the serialised representation conforms to three rules, which are discussed with relation to the 3-level octree shown in FIG. 2. In FIG. 2, the root node A is a single volume. The next level splits this volume in to octants B1-B8, each of which represents a physical sub-volume. B1, B2, B3 and B4 represent quadrants of the lower half of the volume whereas B5, B6, B7 and B8 relate to the upper half of the volume. FIG. 2 also shows the next level, but for the purposes of simplicity of illustration, this is shown for B1 only. The next level splits B1 into octants $C_11$ to $C_18$ (wherein this notation is extended below such that B2 may be split into octants labelled $C_21$ to $C_28$, and more generally Bn may be split into octants labelled $C_n1$ to $C_n8$), each of which represents a physical sub-volume. Again, in this example $C_n1$-$C_n4$ represent the lower half of each B volume for n=1 to 8. It will be understood that each node comprises data describing at least one aspect of the object, as is further set out below.

The first rule to be applied in forming the serialised representation is that a node representing a volume which includes a layer of the object to be generated earlier in an intended order of object generation precedes a node representing a volume which consists of layer(s) of the object to be generated subsequently.

In additive manufacturing, objects are generally built from the bottom up. Taking the example of FIG. 2, the layer to be generated first in such an example is the lowest layer, which comprises $C_n1$-$C_n4$ for n=1 to 4. B1-B4 also include this layer, as does A. Therefore, this rule means that A and B1-B4 will be listed before B5-B6 (which do not include a representation of the first layer, and consist exclusively of layers to be generated subsequently thereto). It also means that $C_n1$ to $C_n4$ for n=1 to 4 will be listed before all other C nodes.

The second rule is that nodes representing a volume which includes a given layer of the object are ordered based on the level of the nodes within the octree representation, wherein parent nodes appear before descendent nodes. Thus, for the first layer, A will be listed before any of B1 to B4 and that B1 to B4 will be listed before $C_n1$ to $C_n4$ for n=1 to 4.

The third rule is that, after the first and second rules have been applied, i.e. for nodes representing a volume which includes a given layer of the object and being of the same level within the octree, nodes are serialised according to a location encoding pattern. For example, this may be Morton (Z-order) code or the like which defines a particular path through the space. A Morton code is one example of a function which maps multidimensional data to one dimension while preserving locality. In this example, the location encoding pattern may therefore be applied to determine the order of B1 to B4 and of $C_n1$ to $C_n4$ for n=1 to 4.

As noted above, for the first layer of the object, this would result in an order of A, B1-4 (ordered according to the location encoding pattern), $C_n1$-$C_n4$ for n=1 to 4 (ordered according to the space encoding pattern). This gives a first portion of a serialised representation. For ease of representation, the location encoding pattern in indicated in square brackets and this portion could be summarised as:

A:[B1-B4]:[$C_n1$-$C_n4$]$_{n=1-4}$

The next layer up which is not represented by $C_n1$-$C_n4$ for n=1 to 4 comprises $C_n5$-$C_n8$ for n=1 to 4. However, this layer is also represented by B1-B4 and A, and therefore representing this layer simply means adding $C_n1$-$C_n4$ for n=5 to 8 to the end of the code portion above, as this breaks none of the rules, extending the serialised representation as follows:

A:[B1-B4]:[$C_n1$-$C_n4$]$_{n=1-4}$:[$C_n5$-$C_n8$]$_{n=1-4}$

The next layer up which is not yet represented includes parts of B5-B8, which should be included before their descendent nodes. This gives, in this example, a serialised representation of the object contained in the volume A as follows:

A:[B1-B4]:[$C_n1$-$C_n4$]$_{n=1-4}$:[$C_n5$-$C_n8$]$_{n=1-4}$:[B5-B8]:[$C_n1$-$C_n4$]$_{n=5-8}$:[$C_n5$-$C_n8$]$_{n=5-8}$

Although not shown, a 'D' level node may be defined, comprising each $C_nm$ (where n=1 to 8 and m=1 to 8) volume split into octants. In an example these octants may describe print resolution voxels. Such D level nodes may be inserted into a serialised representation after their corresponding 'C' level representations according to the Z-first ordering.

The discussion above assumes that the octree is complete in the sense that all possible nodes are explicitly represented. This may not be the case in all examples as is set out below.

Such a data structure is well suited to three dimensional printing as the data which describes a particular level of an object is concatenated into a continuous string. This may be contrasted with n octree represented in level order (which may be term 'breadth-first' ordering), in which, under the same notation, the description of the object may be as follows:

A:[B1-B8]:[$C_11$-$C_18$]: . . . :[$C_81$-$C_88$]

Another possible representation of the data may be a 'depth first' ordering, which could be expressed as follows:

A:B1:$C_11$-$C_18$:B2:$C_21$-$C_28$:B3:$C_31$-$C_38$ . . . B8:$C_81$-$C_88$

In such representations, the description of the first layer to be manufactured, $C_n1$-$C_n4$ for n=1-4, is dispersed throughout the data and retrieving the data becomes complicated. Moreover, as will become apparent from the discussion which follows, such representations do not allow data retrieved in relation to one layer to be of assistance in retrieving data in relation to subsequent layer.

In the above examples, the node representing the root node A is arranged first in the serialisation.

The data is arranged in a serialisation in the sense that a data reader will understand that the data is associated with the specified order. In some examples, the data may be physically dispersed on a storage medium (for example, a random access storage medium). However, the data is stored so as to have a relationship, in which the described arrangement of the data is encoded.

In some examples, a node of an octree represents a volume and comprises eight sub-volumes and each volume may be categorised as one of: (i) having a predetermined attribute over the whole volume (i.e. every sub volume or region thereof shares the predetermined attribute), (ii) lacking the predetermined attribute entirely (i.e. every sub volume or region thereof lacks the predetermined attribute) or (iii) comprising a sub-region having the predetermined attribute and a sub-region lacking the predetermined attribute.

In one example, the attribute may be whether the volume comprises part of an object and each volume may be categorised as one of:

(i) being wholly internal to the object (termed 'black'),
(ii) being wholly external to the object (termed 'white'),
(iii) spanning an object boundary (termed 'grey'), such that a sub region of the volume is internal to the object and another sub region is external.

The designation of grey, white and black could equally be used in relation to other attributes. In this example, are two possible categories for volumes scanning a boundary: a 'terminal grey' volume or an 'intermediate grey' volume. A terminal grey volume may be encoded when the volume is a print resolution volume, or is the smallest volume encoded by a particular model. Such grey volumes may be treated differently than intermediate grey volumes as a decision may be made as to whether to treat the volume as a black or a white volume; i.e. in practical terms, the volume is assigned to be either inside or outside the object. However, such terminal grey volume may be omitted in some examples.

|  | $x_a$ | $x_b$ |
| --- | --- | --- |
| White | 0 | 0 |
| Black | 0 | 1 |
| Grey (Intermediate) | 1 | 0 |
| Grey (Terminal) | 1 | 1 |

In this example the categorisation of a volume is expressed with two bits: 00 for a white volume, 01 for a black volume, 10 for an intermediate grey volume and 11 for a terminal grey volume.

Each node is expressed as a 16 bit string characterising its sub-volumes. Thus, if the object occupied a slice filling the bottom of the cube, taking up the bottom quarter of the cube shown in FIG. 1, the 'A' node would have 4 'grey' sub-volumes and four white sub-volumes. In some examples, the data describing a node may be ordered based on the position of the sub-volumes within a volume. For example, the 'least significant bits', i.e. the bits at the end of the bit string, contain information about the sub-volumes which have smaller z coordinates, when z coordinates are equal then sub-volumes with smaller x coordinates occupy the least significant bits, and so on. However, any other predetermined order could be used.

For example, the A node could be represented in terms of its sub-volumes in number order as B1{10}, B2{10}, B3{10}, B4{10}, B5{00}, B6{00}, B7{00}, B8{00}, or as:

[1010101000000000]

The B1 node has white volumes in the upper half and black (contained in the object) volumes in the lower half, so could be encoded as

[0101010100000000]

In other examples, different orders could be used.

The B5 volume is white: in some examples, this may mean that no node representing the B5 volume is explicitly formed within the octree as there is no more information to be gained in relation to the B5 volume beyond the information provided by the encoding of the A node. As can readily be understood, if a B level volume is wholly interior to an object, then any sub-nodes thereto are also wholly interior to the object. Therefore, it may be the case that only 'grey' nodes, i.e. those which comprise a sub-region having an attribute a sub-region lacking the attribute, are stored. In other words, in some examples, if the volume is white or black, it is not stored as a node as the volume is characterised in the preceding node, and this characterisation extends to all descendants. For example, for an object which occupies a lower half of a volume, this could be fully characterised by a one level octree with a single node, with 4 white sub-volumes with higher z and 4 black sub-volumes with lower z. For example, a 16-bit string could characterise the root node (which is a grey node) as: 0000000001010101. This fully represents the whole object. If however one of the black or white sub-volumes was instead grey, a further node could be formed for that sub volume, characterising the sub volumes thereof.

In some examples, therefore, the octree may comprise only grey nodes (as black and white nodes are not stored) and at voxel, or print resolution, level, sub-volumes may be categorised as black or white. In other examples, a grey node may be any node which is sub-divided (even if the descendent nodes all have or lack an attribute). Black or white nodes may be those nodes which are not sub-divided.

Such encoding could be used to specify any binary attribute, for example, the presence or absence of a particular color, conductivity, elasticity, print agent, or the like. For example, each volume could be categorised as 'red' or 'not red' or 'containing a red sub-region and a non-red sub-region', or categorised as 'conductive' or 'not conductive' or 'containing a conductive sub-region and a non-conductive sub-region'. In other examples, other encoding such as Huffman encoding could be used.

Figure 3:
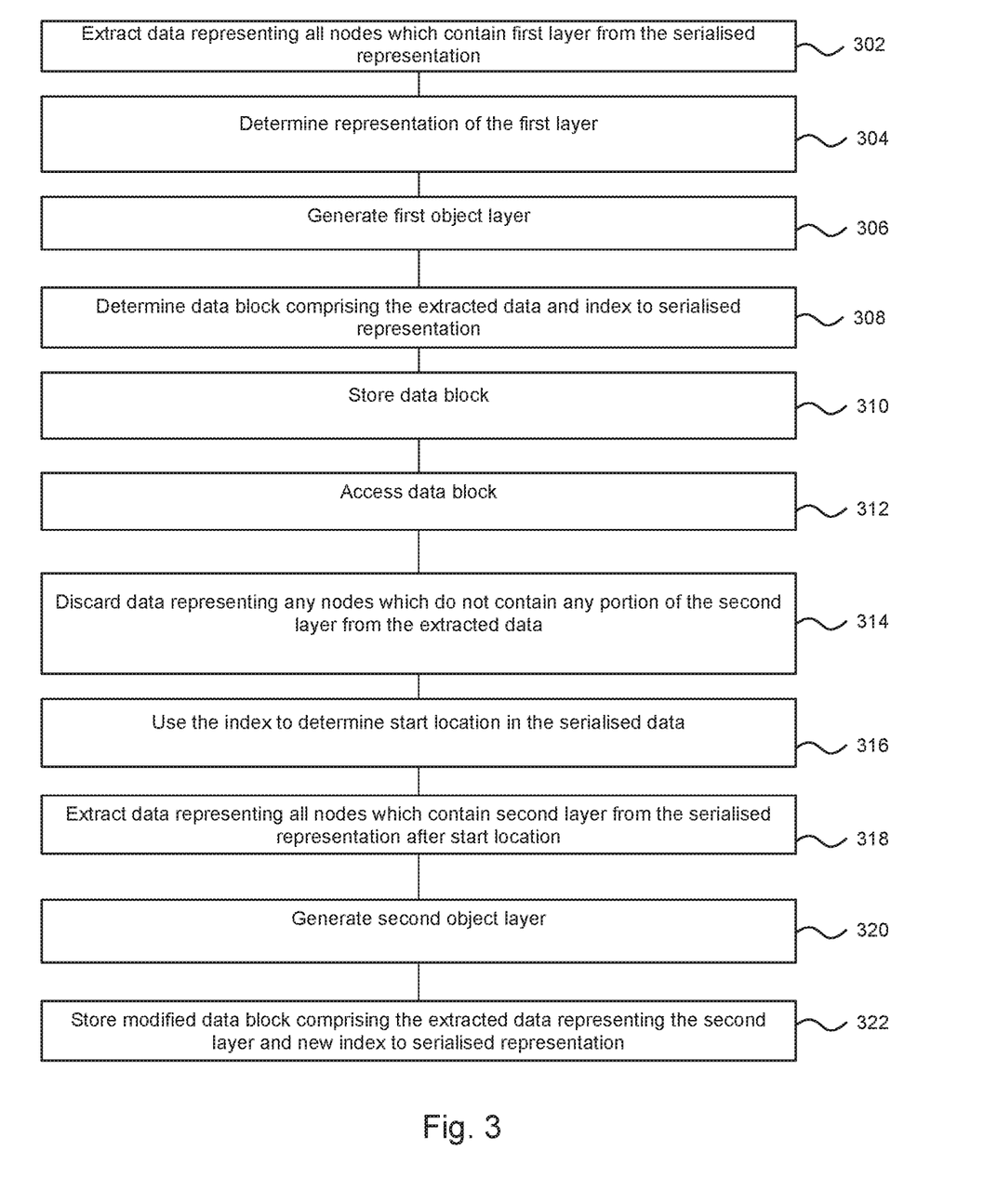
FIG. 3 is a flowchart of an example method for generating object layers.

FIG. 3 is an example of a method, which may be a computer implemented method, comprising generating a data representation of plurality of layers of the object be generated in the layer by layer manufacturing process, which may be carried out on the serialised octree representation arranged as described above with reference to FIG. 1. In some examples, the serialised data may be stored in memory and portions thereof may be retrieved in order to perform the method of FIG. 3. In other examples, the serialised data may be processed as it is formed.

Block 302 comprises extracting, from the serialised octree representation, data representing all nodes which contain at least a portion of the first layer.

Considering the example of FIG. 2, all the nodes which contain a portion of the lowest layer of the object are arranged in a single, continuous string, which may be expressed as:

A:[B1-B4]:[$C_n1$-$C_n4$]$_{n=1-4}$

Note, in this discussion, it is assumed that all nodes B1-B8 and all C nodes exist within the octree—this may not be the case, for example if a B or C node would, if formed, describe a volume which wholly has or wholly lacks an attribute (i.e. as described above, in some examples, only 'grey' nodes may be encoded within the octree, and/or within the serialised representation thereof). In addition, in the discussion of this example, a first layer corresponds to the lower level C nodes and a second layer corresponds to the higher level C-nodes, although in other examples, each of these nodes may be split into sub-volumes, and may represent several layers.

Block 304 comprises determining, from the extracted data, a representation of the first layer. For example, this may comprise extracting the nodes [$C_n1$-$C_n4$]$_{n=1-4}$, (to the extent these nodes are explicitly represented) which provide information about each of a number of sub-volumes thereof. If any of the C nodes are not explicitly represented, determining a representation of the first layer may comprise considering the content of a higher level node, i.e. in this example, a B or the A node, node. In some examples, the determined representation of the first layer may be at an object generation resolution. In examples which include terminal grey volumes, determining the representation of the first layer may comprise assigning each volume as a black or a white volume. In some examples, the representation of the first layer may be used as an input to generate control instructions for an additive manufacturing apparatus. For example, the characterisation of a volume as being interior to the object may result in an instruction to place a fusing agent at a physical location corresponding to that volume. The characterisation of a volume as being wholly external to the object may result in an instruction to place no fusing agent, or to place a detailing agent at a physical location corresponding to that volume.

In some examples, the control instructions may be used to generate an object by an additive manufacturing apparatus.

In this example, in block 306, the method further comprises generating an object layer using the representation of the first layer.

In some examples, the representation of the first layer may be stored in a memory.

In block 308, the method further comprises determining a data block comprising the extracted data and an index indicative of a location in serialised representation which is not contained in the extracted data; and, in block 310, storing the data block in a memory.

This data block may for example comprise a 'struct' as the term in used in the C programming language (amongst others).

The index may comprise a pointer indicating the last extracted node, or the first 'unextracted' node in the serialised data.

As such a data block may be relatively small when compared to the serialised representation of the object, it may in practical terms be held in a local memory, a processor memory, or relatively fast in-core memory, as opposed to bulk or slower memory resource (for example, 'off-core' or solid state memory resources), which may in some examples store the serialised representation of the object.

In blocks 312 to 318, a data representation of a second layer of the object to be generated in the layer by layer manufacturing process is generated. In this example, the second layer is to be generated immediately after the first layer (i.e., the second layer will lie directly on top of the first layer in the physically generated object). In examples where the C-level nodes represent more than one layer, the data for generating such a layer may be contained within the already extracted data, and therefore this method may be carried out for an appropriate subsequent layer. However, in this example, second layer corresponds to the higher C-nodes.

Block 312 comprises accessing the data block. As noted above, this data block may in some examples be held in local, fast memory as it is relatively small. This could result in a reduction of memory access delay, which for large data files can be significant. Block 314 comprises discarding, from the extracted data, data representing any nodes which do not represent any portion of the second layer. In this example, this leaves the data:

A:[B1-B4]

Block 316 comprises using the index to determine a start location in the serialised octree data. In this example, the index may be a pointer to the position in the serialised octree data which was last read, in example, location "Loc" below. In practice, this may be a pointer to the end of the data portion which was extracted, or to the start of the subsequent data which has not been extracted.

A:[B1-B4]:$[C_n1-C_n4]_{n=1-4}$:*Loc*:$[C_n5-C_n8]_{n=1-4}$:[B5-B8]:$[C_n1-C_n4]_{n=5-8}$:$[C_n5-C_n8]_{n=5-8}$

Block 318 comprises extracting, from the serialised octree representation, data representing all nodes which represent at least a portion of the second layer and which appears after the start location. This may be used, along with the retained data, to generate a representation of the second layer. In this example, the data on which it is based is:

A:[B1-B4]:$[C_n5-C_n8]_{n=1-4}$ (as noted above, to the extent that the B and/or C nodes exist).

In block 320, an object layer is generated using the representation of the second layer.

In block 322, an updated data block comprising the data retained from the first data block and the data extracted in block 318 is stored in a memory, along with a pointer to a new location. In this example, the pointer would be a pointer to the location indicated as *Loc* below:

A:[B1-B4]:$[C_n1-C_n4]_{n=1-4}$:$[C_n5-C_n8]_{n=1-4}$:*Loc*:[B5-B8]:$[C_n1-C_n4]_{n=5-8}$:$[C_n5-C_n8]_{n=5-8}$

This process may be carried out iteratively, layer after layer in the intended order of manufacture, with an updated data block being created and used for the next layer until data relating to the final layer is retrieved. In this example, the next layer up is in the regions B5-B8 and not B1-B4, so the data to be discarded would leave just node A from the previous data block, and the next data string to be extracted would comprise [B5-B8]:$[C_n1-C_n4]_{n=5-8}$.

As has been discussed above, in some examples a data block may be held in an in-core, or relatively fast memory resource (for, example, local RAM) and accessed with relative efficiency. The serialised representation may be held in an "off-core" high capacity memory resource such as a solid state memory resource. Data extraction tasks for such a high capacity memory, which may be relatively slow in terms of data access times, are effectively dispersed throughout the processing to generate the layers. In the above example, the method is carried out during object generation, in which case it may contribute to providing substantially constant layer processing times which are not unduly lengthy. Data processing for a subsequent layer may carried out while generation of a preceding layer is ongoing. In some examples, data processing for a plurality of layers may be carried out concurrently.

To consider the effect of layer processing times, an example additive manufacturing process may involve various processes. A layer of build material may be formed on a print bed, or build platform. The layer of build material may be formed using, for example, a build material distributor, which may deposit and spread build material onto the print bed at an intended thickness.

The layer of build material may be preheated using, for example, a radiation source such as an infrared lamp, or by some other means. Print agent may be distributed onto the layer of build material by an agent distributor. Energy, for example heat from a fusing lamp or from multiple fusing lamps, may be applied to the layer of build material so as to cause coalescence and solidification of those portions of build material to which fusing agent has been applied. In a further example, the layer of build material may be allowed to settle and cool down.

The processes described above with reference to an example additive manufacturing process may form part of a layer processing cycle which may be repeated for each layer of a multi-layered object to be generated. The layer processing cycle, or layer generation cycle, may be considered to include a set of processes performed in respect of a single layer of build material so as to form a slice of the three-dimensional object to be built, and the time to perform the set of processes in respect of a single layer of build material may be considered to be a layer processing time, or layer generation time. This may include the processing time for generating the instructions to be used in forming the layer, for example specifying the placement of print agent, a temperature or the like, which may be based on data extracted from a representation of the object.

It may be intended that the layer processing time is the same or approximately the same for all of the layers of an object to be generated. That is to say, the layer processing time for each layer in an additive manufacturing process may be approximately constant or fixed. Here, the expression "the same" is intended to mean exactly the same or approximately the same.

Maintaining a constant or approximately constant layer processing time for all layers of an object to be generated helps to ensure that the object is generated with consistent layers.

By storing the data in the serialised manner described, the retrieval thereof may effectively be 'amortised' throughout data processing, and constant layer processing times which are not unduly long may be more readily achieved. In some examples, processing of a subsequent layer may start while generation of a preceding layer is on-going.

In some examples, data blocks relating to a number of layers may be prepared and held in memory at the same time, for example to aid computation of certain properties such as inter-layer spacing of parts of an object to be generated.

Figure 4:
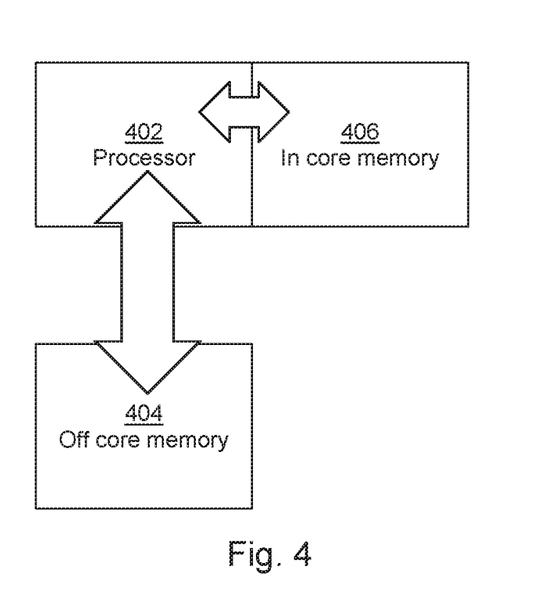
FIG. 4 is a schematic drawing of an example computer system.

FIG. 4 shows a schematic representation of computer system comprising a processor 402, an off-core memory 404 and an in-core memory 406. The off-core memory 404 and in-core memory 406 may respectively comprise a 'remote' and a 'local' memory, where those terms should be understood in terms of data retrieval for the processor: an in-core memory 406 may be accessed more quickly than an off-core memory 404. An off-core memory 404 may for example be structured for efficient bulk storage of data, whereas an in-core memory may be configured to provide data substantially on demand. To that end, the memories 404, 406 may be of different types. For example, the off-core memory 404 may comprise a solid state memory, for example a Hard Disk Drive HDD or a Solid State Drive (SSD) whereas the in-core memory may comprise Random Access Memory (RAM). In other examples, the off-core memory 404 may comprise a read-only memory.

In some examples, the in-core memory 406 may be physically closer to the processor 402 (in order to allow for shorter signal paths), and may be physically smaller than the off-core memory 404. In some examples, the processor 402 may be connected to the off-core memory 404 via a computer network, such as a Local Area Network, a Wide Area Network, or the internet, whereas the in-core memory may be arranged in or near the apparatus comprising the processor 402. In some examples, the in-core memory 406 may be provided on the same chip or die as the processor, or the processor may be a 'processing in memory' processor. In some examples, the memories 404, 406 could be substantially co-located. In-core and off-core memories may be replaced by local and remote memories respectively in other examples, In some examples, the serialised data may be stored in the off-core memory 404 and the data block comprising just those portions of the data relating to a particular layer may be stored in the in-core memory 406. It may be noted that, once the data block for the first layer has been formulated, at least some data relating to the second layer has already been retrieved from the off-core memory 404. The relatively slow retrieval of data is spread throughout the data retrieval and processing (and in some examples, throughout an object generation exercise).

Figure 5:
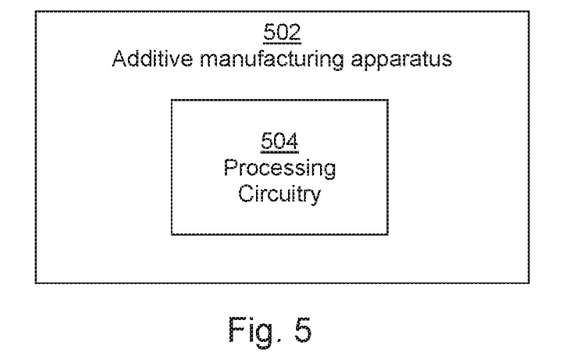
FIG. 5 is a schematic drawing of an example schematic drawing of an example additive manufacturing apparatus.

FIG. 5 shows an additive manufacturing apparatus 502 comprising processing circuitry 504. The processing circuitry 504 is adapted to generate a data representation of a first layer of an object be generated in a layer-by-layer manufacturing process from a serialised representation of at least part of an object to be manufactured, wherein the serialised representation comprises data representing a plurality of nodes, the nodes representing the object at a first volumetric resolution and a second volumetric resolution, and the nodes being ordered such that:

a node representing a volume which includes a layer of the object to be generated earlier in an intended order of object generation precedes a node representing a volume which consists of (i.e. is entirely made up of) layer(s) of the object to be generated subsequently;

for nodes representing a volume which includes a given layer of the object, nodes representing the object a coarser volumetric resolution are ordered before nodes representing the object at a finer volumetric resolution; and nodes representing a volume which includes a given layer and being of the same resolution are serialised according to a predetermined location encoding pattern;

The processing circuitry 504 may be arranged to generate the data representation of the first layer by extracting, from the serialised representation, a continuous data string representing all nodes which represent at least a portion of the first layer; and to determine, from the data, a representation of the first layer.

For example, the processing circuitry 504 may be arranged to carry out block 302 to 304 of FIG. 3. The processing circuitry 504 may be arranged retrieve the data from a serialised representation from a first memory resource (for example, a remote memory) and to store the retrieved data and/or a representation of the first layer in a second memory resource (for example, a local memory). In such an example, the additive manufacturing apparatus 502 may comprise the first or second memory resource. In some examples, the additive manufacturing apparatus 502 comprises the second memory resource and is connected to the first memory resource over a network of the like.

The processing circuitry 504 may be arranged to determine a representation of the first and/or second layer (and any subsequent layer) and in some examples may be arranged to determine, for each of a plurality of volumes at a print apparatus addressable resolution, whether that volume is internal to the object, or external to the object. In other examples, it may be determined whether that volume is to be manufactured to have a particular attribute or property or lack a particular attribute or property.

The processing circuitry 504 may be arranged determine a data block comprising extracted data and an index indicative of a location in serialised representation which is not contained in the extracted data, for example as discussed in relation to block 308.

The processing circuitry 504 may be arranged to generate a data representation of a second layer of the object be generated in the layer-by-layer manufacturing process, wherein the second slice is to be generated after the first slice, wherein generating the data representation of the second layer comprises discarding, from the extracted data, data representing any nodes which do not contain any portion of the second layer, using the index, determining a start location in the serialised data; and extracting, from the serialised representation, data representing all nodes which contain at least a portion of the second layer and which appears after the start location. This may comprise extracting a continuous data string. For example, the processing circuitry 504 may be arranged to carry out blocks 312 to 318 of FIG. 3.

The processing circuitry 504 may be arranged to carry out any other block of FIG. 3.

The processing circuitry 504 may have any attribute described in relation to the processor 402.

The additive manufacturing apparatus 502 may comprise, or be associated with, a print bed, a fabrication chamber, a print head, one or more energy sources, a source of build material, a source or one or more print agent, or any other additive manufacturing apparatus component.

Figure 6A:
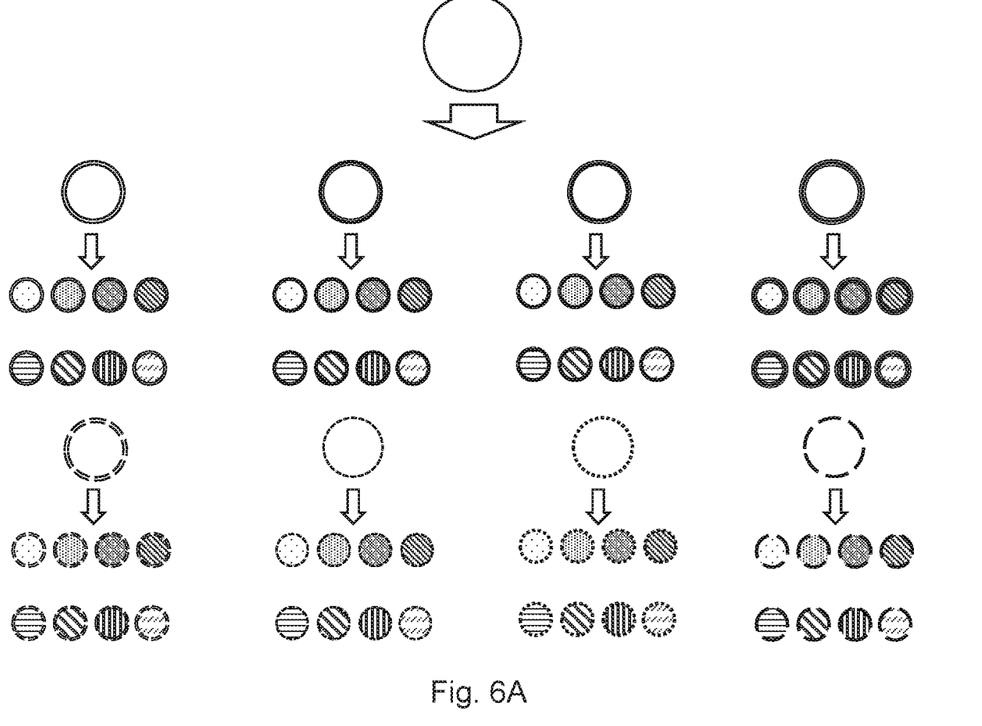
FIGS. 6A and 6B are schematic drawing illustrating representations of an octree structure.

FIG. 6A shows an octree representation of a representation of at least part of an object to be manufactured in a layer-by-layer manufacturing process. The representation comprises data representing a plurality of nodes, shown as circles, the nodes comprising representations of the object at first volumetric resolution; a second volumetric resolution and a third volumetric resolution, wherein, in the second volumetric resolution, the volumes of the first volumetric resolution are subdivided into octants and, in the third volumetric resolution, the volumes of the second volumetric resolution are subdivided into octants. Here, the circles representing the third volumetric resolution are smaller than those representing the second volumetric resolution, which are smaller than those representing the first volumetric resolution.

The representation is two dimensional, showing Z dimension within a volumetric resolution (i.e. a node of a given size which represents a lower portion of the object is shown to be lower on the page than nodes of that size which represent portions which are higher in the object), but the X and Y dimensions are flattened.

Figure 6B:
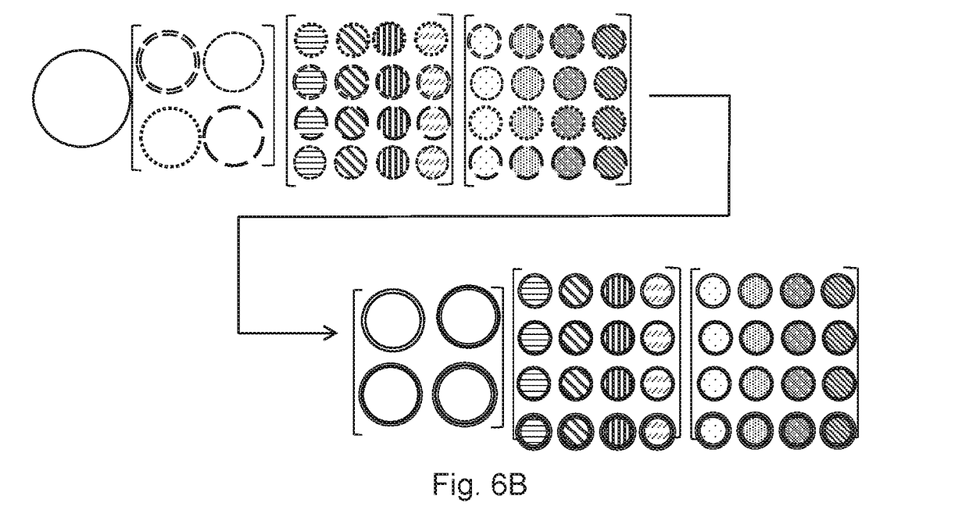

FIG. 6B shows a serialised representation of the nodes, in which a node representing a volume which includes a layer of the object to be generated earlier in an intended order of object generation precedes a node representing a volume which consists of layer(s) of the object to be generated subsequently.

In addition, for nodes representing a volume which includes a given layer of the object, nodes at the first volumetric resolution precede nodes at the second volumetric resolution and nodes at the second volumetric resolution precede nodes at the third volumetric resolution.

Moreover, nodes representing a volume which includes a given layer and being of the same resolution are serialised according to a predetermined location encoding pattern. In FIG. 6B this is represented by square brackets. The set of nodes within each set of square brackets may be flattened into a one dimensional array using any location encoding pattern, such as a Morton, or Z order, code, or the like.

It will be understood that an object could be represented at more than three levels of resolution.

In FIG. 6B, the serialised code is shown on two lines due to the constraint of the page area. Conceptually, this should be viewed as a continuous serialisation of the data.

The data structure shown in FIG. 6B is suited to 'amortised' data retrieval in additive manufacturing processes, as described above.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted, and at least some processes may be carried out in parallel. Blocks described in relation to one flow chart may be combined with those of another flow chart. It shall be understood that at least some flows in the flow chart, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
receiving, in a system comprising a processor, data representing at least part of an object to be manufactured in a layer-by-layer manufacturing process; and
generating, by the system from the data, a serialised octree representation of at least part of the object comprising a plurality of nodes, wherein the generating of the serialised octree representation comprises ordering the plurality of nodes such that:
a node representing a volume that includes a layer of the object to be generated earlier in an intended order of object generation precedes a node representing a volume that includes a layer of the object to be generated subsequently;

nodes representing a volume that includes a layer of the object are ordered based on a level of the nodes within the serialised octree representation, wherein parent nodes appear before descendent nodes; and nodes representing a volume that includes a layer of the object and being of the same level within the serialised octree representation are ordered according to a location encoding pattern.

2. The method of claim 1, wherein the location encoding pattern is a Morton code pattern.

3. The method of claim 1, wherein the generating of the serialised octree representation comprises ordering the plurality of nodes such that a root node appears first in the serialised octree representation.

4. The method of claim 1, wherein each node of the serialised octree representation describes a given volume as one of:

having a consistent predetermined attribute throughout the given volume, or lacking the predetermined attribute throughout the given volume, or having the predetermined attribute in a sub-portion of the given volume.

5. The method of claim 1, comprising generating, by the system, a data representation of a first layer of the object to be generated in the layer-by-layer manufacturing process, wherein the generating of the data representation of the first layer comprises:

extracting data representing all nodes that contain at least a portion of the first layer from the serialised octree representation; and determining, from the extracted data, the data representation of the first layer.

6. The method of claim 5, further comprising generating an object layer using the data representation of the first layer.

7. The method of claim 5, further comprising:

determining, by the system, a data block comprising the extracted data and an index indicative of a location in the serialised octree representation that is not contained in the extracted data; and storing the data block in a memory.

8. The method of claim 7, comprising generating, by the system, a data representation of a second layer of the object to be generated in the layer-by-layer manufacturing process, wherein the second layer is to be generated after the first layer, and wherein generating the data representation of the second layer comprises:

discarding, from the extracted data, data representing any nodes that do not contain any portion of the second layer;

using the index, determining a start location in the serialised octree representation; and extracting, from the serialised octree representation, data representing all nodes that contain at least a portion of the second layer and that appear after the start location.

9. The method of claim 1, wherein each node of the serialised octree representation is represented by a bit-string of a predetermined common length.

10. The method of claim 9, wherein the bit-string is a 16-bit bit-string.

11. A computer system comprising:

a processor; and a non-transitory storage medium storing instructions executable on the processor to:

generate a data representation of a first layer of an object to be generated in a layer-by-layer manufacturing process from a serialised representation of at least part of the object, wherein the serialised representation comprises data representing a plurality of nodes, the plurality of nodes representing the object at a first volumetric resolution and a second volumetric resolution, and the plurality of nodes being ordered such that:

a node representing a volume that includes a layer of the object to be generated earlier in an intended order of object generation precedes a node representing a volume that includes a layer of the object to be generated subsequently;

for nodes representing a volume that includes a layer of the object, nodes representing the object of a coarser volumetric resolution are ordered before nodes representing the object at a finer volumetric resolution; and nodes representing a volume that includes a layer and being of the same resolution are serialised according to a predetermined location encoding pattern, wherein the generating of the data representation of the first layer comprises extracting, from the serialised representation, data representing nodes that represent at least a portion of the first layer, wherein the data representation of the first layer is based on the extracted data.

12. The computer system of claim 11, wherein the instructions are executable on the processor to determine a data block comprising the extracted data and an index indicative of a location in the serialised representation that is not contained in the extracted data.

13. The computer system of claim 12, wherein the instructions are executable on the processor to generate a data representation of a second layer of the object to be generated in the layer-by-layer manufacturing process, wherein the second layer is to be generated after the first layer, wherein the generating of the data representation of the second layer comprises:

discarding, from the extracted data in the data block, data representing any nodes that do not represent any portion of the second layer;

using the index, determining a start location in the serialised representation; and extracting, from the serialised representation, data representing nodes that represent at least a portion of the second layer and that appears after the start location.

14. The computer system of claim 11, wherein the generating of the data representation of the first layer comprises determining for each respective volume of a plurality of volumes at a print apparatus addressable resolution, whether the respective volume is internal to the object or external of the object.

15. A non-transitory machine readable medium comprising instructions that upon execution cause a system to:

generate a representation of at least part of an object to be manufactured in a layer-by-layer manufacturing process, wherein the representation comprises data representing a plurality of nodes, the plurality of nodes comprising representations of the object at first volumetric resolution, a second volumetric resolution and a third volumetric resolution, wherein, at the second volumetric resolution, volumes of the first volumetric resolution are subdivided into octants and, at the third volumetric resolution, volumes of the second volumetric resolution are subdivided into octants, the plurality of nodes being ordered such that:
- a node representing a volume that includes a layer of the object to be generated earlier in an intended order of object generation precedes a node representing a volume that includes a layer of the object to be generated subsequently;
- for nodes representing a volume that includes a layer of the object, nodes at the first volumetric resolution precede nodes at the second volumetric resolution and nodes at the second volumetric resolution precede nodes at the third volumetric resolution; and
- nodes representing a volume that includes a layer and being of the same resolution are ordered according to a predetermined location encoding pattern.

16. The computer system of claim 11, wherein the predetermined location encoding pattern comprises a Morton code pattern.

17. The non-transitory machine readable medium of claim 15, wherein the instructions upon execution cause the system to:
- generate a data representation of a first layer of the object to be generated in the layer-by-layer manufacturing process, wherein the generating of the data representation of the first layer comprises:
  - extracting data representing nodes that contain at least a portion of the first layer from the representation of at least part of the object; and
  - determining, from the extracted data, the data representation of the first layer.

18. The non-transitory machine readable medium of claim 17, wherein the instructions upon execution cause the system to:
- generate a data representation of a second layer of the object to be generated in the layer-by-layer manufacturing process, wherein the second layer is to be generated after the first layer and wherein generating the data representation of the second layer comprises:
  - discarding, from the extracted data, data representing any nodes that do not contain any portion of the second layer;
  - determining a start location in the representation of at least part of the object; and
  - extracting, from the representation of at least part of the object, data representing nodes that contain at least a portion of the second layer and that appear after the start location.

* * * * *